Patented Aug. 22, 1944

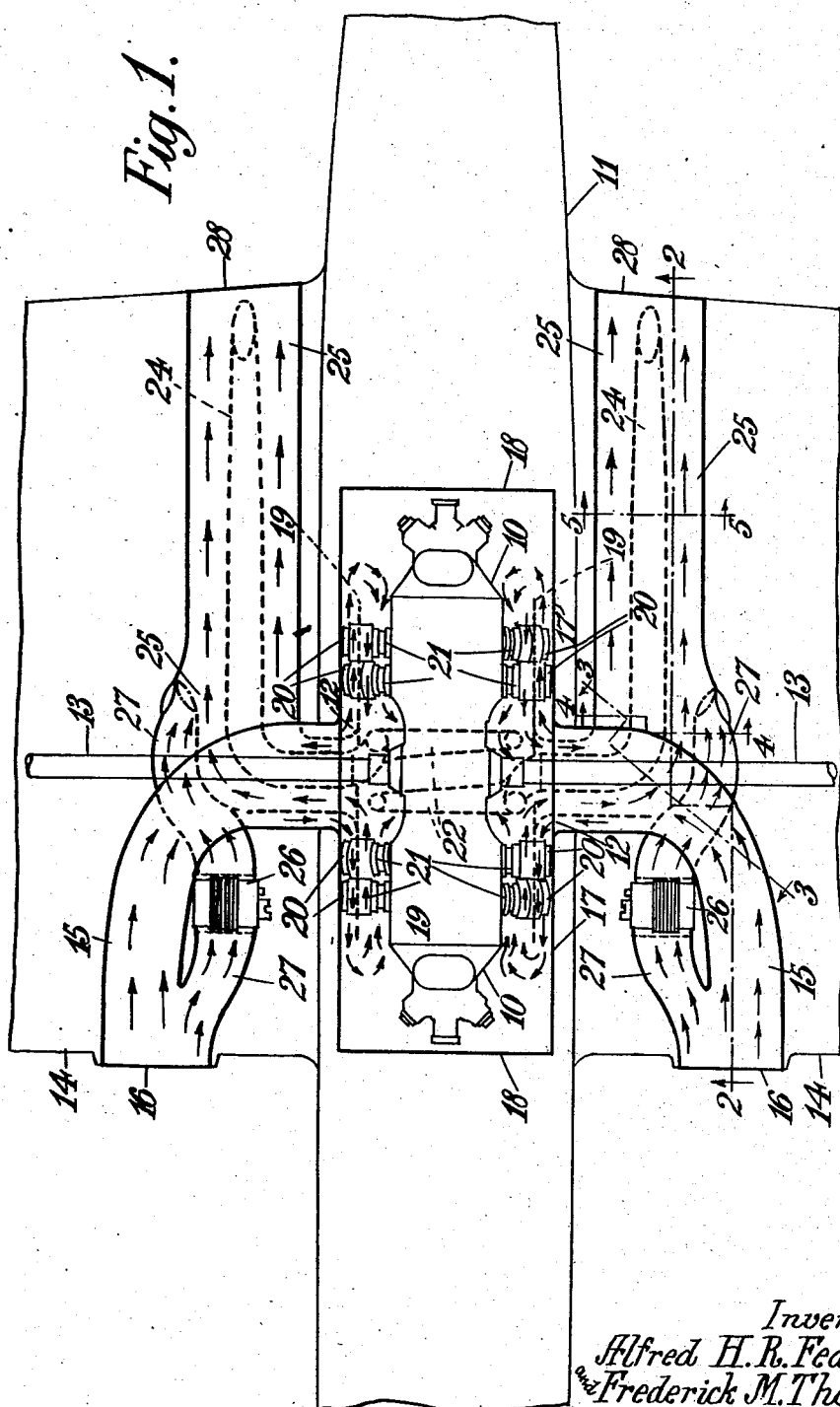

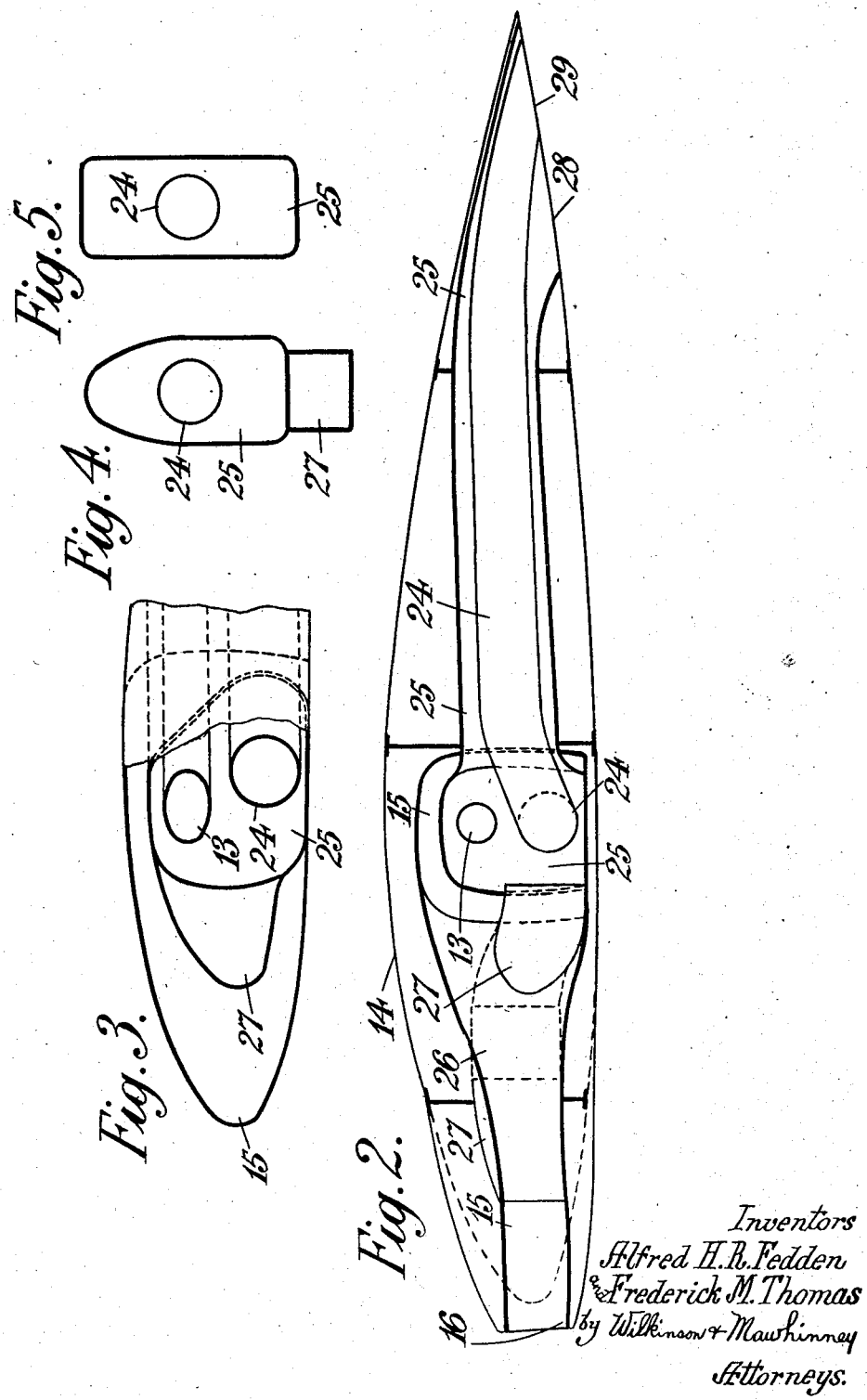

2,356,452

UNITED STATES PATENT OFFICE 2,356,452

INTERNAL-COMBUSTION ENGINE INSTALLATION

Alfred Hubert Roy Fedden, Bristol, England, and Frederick Metcalf Thomas, North Adams, Mass., assignors to The Bristol Aeroplane Company Limited, Bristol, England, a British company Application January 14, 1942, Serial No. 426,774
In Great Britain January 17, 1941

5 Claims. (Cl. 244—55)

In an air-cooled internal-combustion engine installation wherein the engine is totally enclosed, a considerable part of the exhaust pipes or ducts necessarily lies within the enclosure, and since it is at a high temperature it must be effectively isolated from the ducts whereby the cold air which is required to cool the engine is introduced, and also from the air which is to be used for combustion. The cold air to be used for different purposes is conveniently conveyed by ducts which isolate the various flows from one another, and finally the air which has been heated, as for example by cooling the engine, must also be disposed of. The object of this invention is to provide an improved construction and arrangement of ducts for all these purposes.

According to this invention in an air-cooled internal-combustion engine installation, the ducts for cold air, heated air, and exhaust gases are so disposed that a cold air duct and an exhaust duct are separated from one another by a heated-air duct. With this arrangement the minimum temperature-difference is obtained between any two adjacent ducts so that the transfer of heat between them is also kept to a minimum, and the maximum economy of space and simplicity of manufacture is obtained.

Preferably the various ducts are arranged one within another, so that the duct for the exhaust gases is surrounded by a space constituting a duct for the heated outgoing air, and the latter is surrounded by a space constituting a duct for the cold incoming air.

According to another feature of this invention, the heated-air duct surrounding the exhaust duct is extended throughout the full length thereof, thereby ensuring a considerable cooling of the exhaust gases by transfer of heat to the outgoing air. This air can be discharged to mix with the outgoing exhaust gases at the outlet orifice in such a manner as to give a reaction thrust from their combined momentum, and to effect an additional pressure drop in the cooling air exit thereby assisting the flow of such air.

The invention is advantageously used in conjunction with those described in the specifications of United States Applications Nos. 426,775 and 426,776, and such an arrangement is illustrated in the accompanying drawings as one embodiment of the present invention.

In these drawings:

Figure 1 is a sectional plan of part of an aircraft showing the power plant installation and the ducts leading to and from it, Figure 2 is a sectional elevation on the line 2—2 of Figure 1, Figures 3, 4 and 5 are detailed views being respectively sections on the lines 3—3, 4—4 and 5—5 of Figure 1.

Like reference characters indicate like parts throughout these drawings.

In the power plant installation illustrated, two radial internal-combustion engines 10 are mounted in the fuselage 11 of an aircraft with their crankshaft axes parallel to the longitudinal axis thereof; the engines 10 are arranged face to face but spaced apart to provide a chamber 12 between them. The engines are coupled together by suitable gearing from which a drive is transmitted by two shafts 13 extending laterally from the fuselage within the wings 14 to airscrews mounted at any convenient point in the wings at each side of the fuselage.

The engines are totally enclosed within the fuselage and there is provided in each wing an air-duct 15 extending from an opening 16 in the leading edge of the wing to the side of the chamber 12 between the two engines.

Each engine is enclosed in a substantially cylindrical cowl 17 and the adjacent ends of these cowls are joined together to constitute the peripheral wall of the chamber 12 into which the ducts 15 lead. The other ends of the two cowls are completely closed by end-plates 18.

Within each of the cowls 17 there is mounted a cylindrical partition 19 which separates the cylinder-heads 20 from the cylinder-barrels 21, and each partition 19 terminates short of the end-plate 18 so as to provide communication between the annular space around the cylinder-heads to the internal space around the cylinder-barrels. Conveniently also the adjacent ends of the two partitions 19 are joined together in the chamber 12. The exhaust gases from each engine flow into a collecting ring 22, these two rings being situated in the space 12 between the two engines.

The air supply to the engine entering at the inlets 16 is conveyed by the ducts 15 and enters the chamber 12 at each side, and is then made to flow first over the cylinder-heads 20 between the cowl 17 and the partition 19 and then to return inside the partition 19 round the cylinder-barrels 21 as is more fully described in the specification of United States Application No. 427,775. This air which has been heated, by cooling the cylinders, then flows out by conduits 25 opening from each side of the partition 19 and extending rearwardly inside the wing (see Figure 2) to an outlet 28 on the under side thereof near the trailing edge. The exhaust gases are led out from the two collecting rings 22 aforesaid by tail-pipes 24, one allocated to each ring and situated respectively inside the two heated-air outlet ducts 25. Preferably these tail-pipes 24 extend to outlets 29 at the end of the ducts 25 as shown in Figure 2.

It will be seen that the cold air duct 15, at the part adjacent the cowling 17 surrounds the heated-air outlet duct 25, and that the tail-pipes 24 are each situated within a duct 25 and are therefore separated by it from the cold, incoming air so that there can be no direct transfer of heat from the hot exhaust gases to the incoming cooling air.

Oil coolers 26 for the engines may be arranged in separate ducts 27 which are supplied with air from the inlets 16 respectively, and the heated air from these coolers passes on and enters the heated-air duct 25 as shown in Figure 1.

It is not essential that the cold air duct should entirely surround the heated-air duct, but merely that it should not be at any point in direct contact with the exhaust gases or the exhaust ducts, and as will be seen from Figures 2 and 3, the cold air duct 15 only partly surrounds the heated-air duct 25 at that point in order conveniently to accommodate the exhaust pipe 24 and the driving shaft 19. The exhaust tail-pipe 24 however, is throughout its length entirely surrounded by the heated-air outlet duct 24 as shown in Figures 4 and 5 as well as in Figures 1, 2 and 3.

We claim:

1. In an aircraft having a wing, the combination with an enclosed engine chamber, an air-cooled internal-combustion engine in the chamber, a duct for heated air extending laterally from the chamber through the wing to an air-outlet near the trailing edge of the wing, a duct for exhaust gases extending from the engine entirely within the heated-air duct, a duct for cold air extending from an air-intake at the leading edge of the wing to enter the engine chamber laterally and at least partly surround the heated-air duct at the place where it enters the chamber, and partitioning means within the chamber to cause the cold air admitted through the cold air duct to flow over the engine first in one direction and then in the reverse direction to the heated air duct.

2. In an aircraft, the combination with an engine chamber, an air-cooled internal-combustion plant within the chamber, and a wing on either side of the chamber, of two ducts for heated air extending oppositely and symmetrically from the chamber into the wings and to outlets symmetrically disposed with respect to the chamber near the trailing edges of the wings, two ducts for exhaust gases leading from the plant one entirely within each heated-air duct, two ducts for cold air which extend one within each wing from two air-intakes disposed symmetrically with respect to the engine chamber in the leading edges of the wings and which enter the chamber at opposite sides and each at least partially surrounds the heated-air duct on the same side of the chamber at the place where it enters the chamber, and partitioning means within the chamber to cause the cold air admitted through the cold air ducts to flow over the engine first in one direction and then in the reverse direction to the heated air ducts.

3. In an aircraft, the combination with an engine chamber, two engines spaced apart within the chamber, and a wing on either side of the chamber, of two ducts for heated air which extend oppositely and symmetrically from the space between the two engines in the chamber through the wings to outlets symmetrically disposed near the trailing edges of the wings, two ducts for exhaust gases leading one from each engine and entirely enclosed in the heated-air ducts respectively, two ducts for cold air which extend from air-intakes symmetrically disposed with respect to the engine chamber in the leading edges of the wings to enter the engine chamber at opposite sides and which partially surround the heated-air ducts where they enter the chamber, and partitioning means within the chamber to cause the cold air admitted through the cold air ducts to flow over each engine away from the space between the engines and then to flow over each engine in the reverse direction into the heated air ducts.

4. The combination with an aircraft having a fuselage and wings one on either side of the fuselage, of an engine chamber in the portion of the fuselage between the wings, two air-cooled internal combustion engines mounted in tandem in the chamber lengthwise of the fuselage, two ducts for heated air which extend oppositely and symmetrically from the space between the two engines in the chamber through the wings to outlets disposed symmetrically near the trailing edges of the wings, two exhaust ducts leading one from each engine through and entirely within a different one of the heated air ducts, two ducts for cold air disposed one in each wing to extend from air intakes symmetrically disposed in the leading edges of the wings to enter the engine chamber at opposite sides and partly to surround the heated air ducts where they enter the chamber, and partitioning means within the chamber to divide it into a space with which the cold air ducts communicate and in which cylinder heads of the engine are located, and a space which communicates with the heated air ducts and with the first space at the ends of the chamber and in which cylinder barrels and exhaust manifolds of the engine are located.

5. The combination with an aircraft having a fuselage and two wings one on either side of the fuselage, of an engine chamber in the fuselage between the wings, a cylindrical partition supported within the chamber with its axis disposed lengthwise of the chamber and the fuselage to divide the chamber into an inner portion and an outer portion that communicate only at the ends of the chamber, two air-cooled internal-combustion engines having radially arranged cylinders and mounted in the chamber with their axes coaxial with the partition and their cylinders extending from the inner portion of the chamber through the partition, two air ducts extending respectively from air intakes disposed symmetrically with respect to the fuselage in the leading edges of the wings, located wholly one in each wing and opening into the outer part of the chamber on opposite sides thereof and between the engines, two heated air ducts opening into the portion of the chamber within the partition between the engines and on opposite sides of the partition, extending oppositely through the walls of the chamber at the place where the cold air ducts enter to be partly surrounded by the cold air ducts and extending within the wings to outlets disposed symmetrically with respect to the fuselage in the rear edges of the wings, and ducts for exhaust gases extending one from each engine within the partition and through and entirely within the heated air ducts.

ALFRED HUBERT ROY FEDDEN.
FREDERICK METCALF THOMAS.